(12) United States Patent
Park et al.

(10) Patent No.: US 11,923,609 B2
(45) Date of Patent: Mar. 5, 2024

(54) RADAR ANTENNA

(71) Applicant: AMOTECH CO., LTD., Incheon (KR)

(72) Inventors: Hyun Joo Park, Seoul (KR); Kyung Hyun Ryu, Seoul (KR); Yun Sik Seo, Suwon-si (KR); Se Ho Lee, Seoul (KR); Jeong Geun Heo, Seoul (KR); Han Ju Do, Pyeongtaek-si (KR); Hyung Ii Baek, Gyeonggi-do (KR)

(73) Assignee: AMOTECH CO., LTD., Incheon (KR)

( * ) Notice: Subject to any disclaimer, the term of this patent is extended or adjusted under 35 U.S.C. 154(b) by 234 days.

(21) Appl. No.: 17/615,045

(22) PCT Filed: May 27, 2020

(86) PCT No.: PCT/KR2020/006858
§ 371 (c)(1),
(2) Date: Nov. 29, 2021

(87) PCT Pub. No.: WO2020/242196
PCT Pub. Date: Dec. 3, 2020

(65) Prior Publication Data
US 2022/0231423 A1     Jul. 21, 2022

(30) Foreign Application Priority Data

May 29, 2019   (KR) ...................... 10-2019-0063047

(51) Int. Cl.
*H01Q 21/00*     (2006.01)
*H01Q 13/10*     (2006.01)

(52) U.S. Cl.
CPC .......... *H01Q 21/005* (2013.01); *H01Q 13/10* (2013.01)

(58) Field of Classification Search
CPC ...... H01Q 21/005; H01Q 1/32; H01Q 1/3233; H01Q 1/42; H01Q 13/10; H01Q 13/0233; H01Q 13/18
See application file for complete search history.

(56) References Cited

U.S. PATENT DOCUMENTS 6,535,173 B2    3/2003  Ou
2009/0079648 A1  3/2009  Matsuo et al.

FOREIGN PATENT DOCUMENTS

JP    2002-223115 A    8/2002
JP    2017-175595 A    9/2017
(Continued)

OTHER PUBLICATIONS

KR Office Action dated Apr. 22, 2021 as received in Application No. 10-2019-0063047.
(Continued)

*Primary Examiner* — Hoang V Nguyen
(74) *Attorney, Agent, or Firm* — Maschoff Brennan

(57) ABSTRACT

Disclosed is a radar antenna including an antenna body including a first plate and a second plate; a slot radiation part and a slot reception part formed in the first plate; a transmission port and a reception port formed in the second plate; and a waveguide formed by assembling the first and second plates. The slot radiation part includes a first slot radiation part configured to radiate a radio wave in a first detection range, and a second slot radiation part configured to radiate radio waves in a second detection range having a larger width and distance than the first detection range.

19 Claims, 10 Drawing Sheets

(56) References Cited

FOREIGN PATENT DOCUMENTS

| KR | 101461129 B1 * | 11/2014 | ............. H01Q 13/16 |
|----|----------------|---------|--------------------------|
| KR | 10-2015-0018697 A | 2/2015 | |
| KR | 10-2019-0004120 A | 1/2019 | |
| WO | WO-2014030488 A1 * | 2/2014 | ............... G01S 7/03 |

OTHER PUBLICATIONS

KR Decision to Grant dated Jun. 30, 2021 as received in Application No. 10-2019-0063047.

* cited by examiner

[FIG. 1]
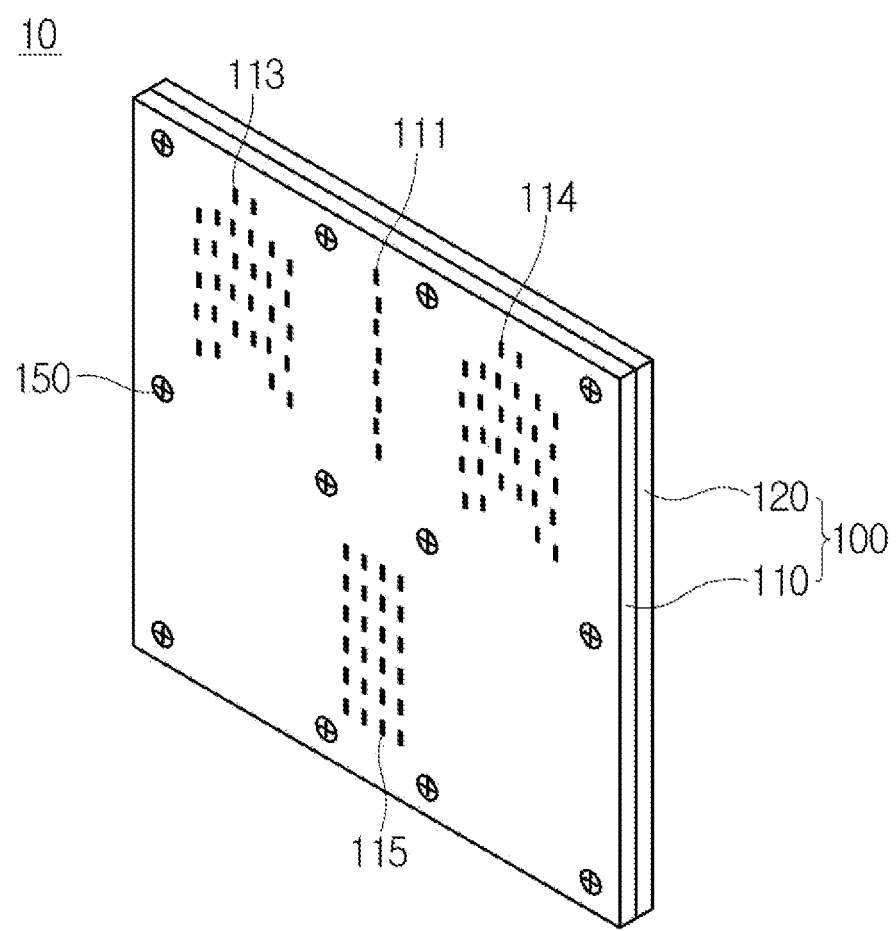

[FIG. 2]
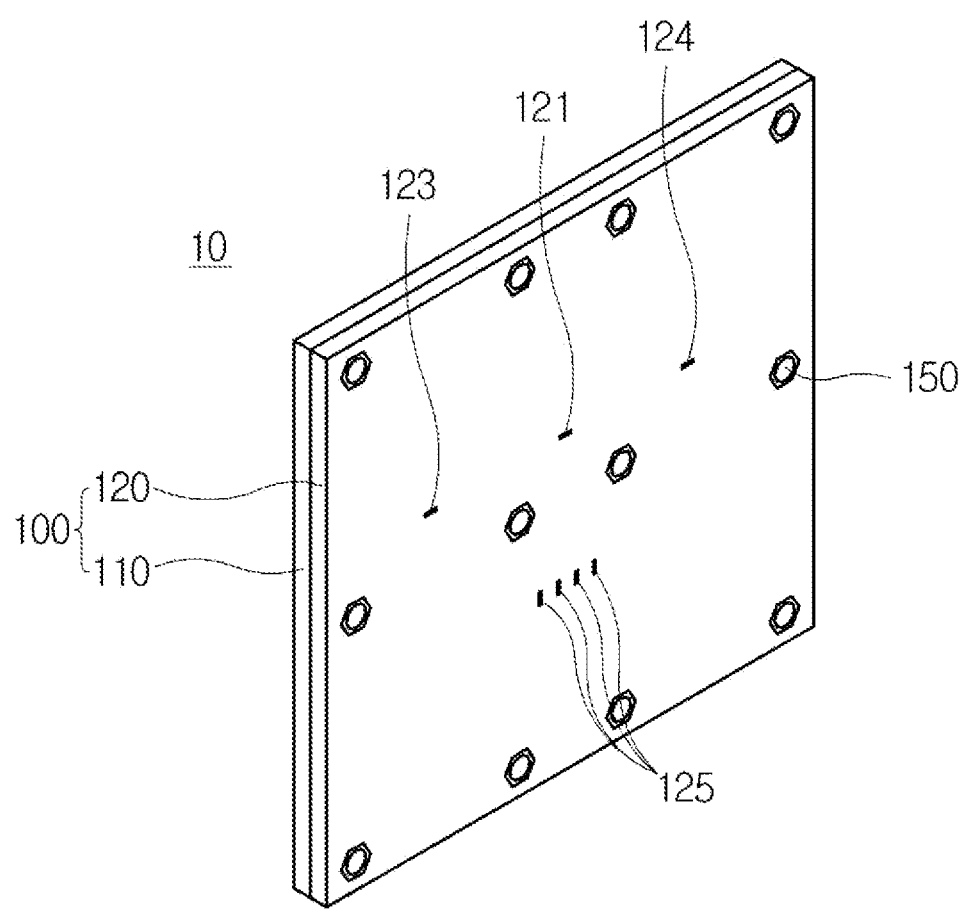

[FIG. 3]
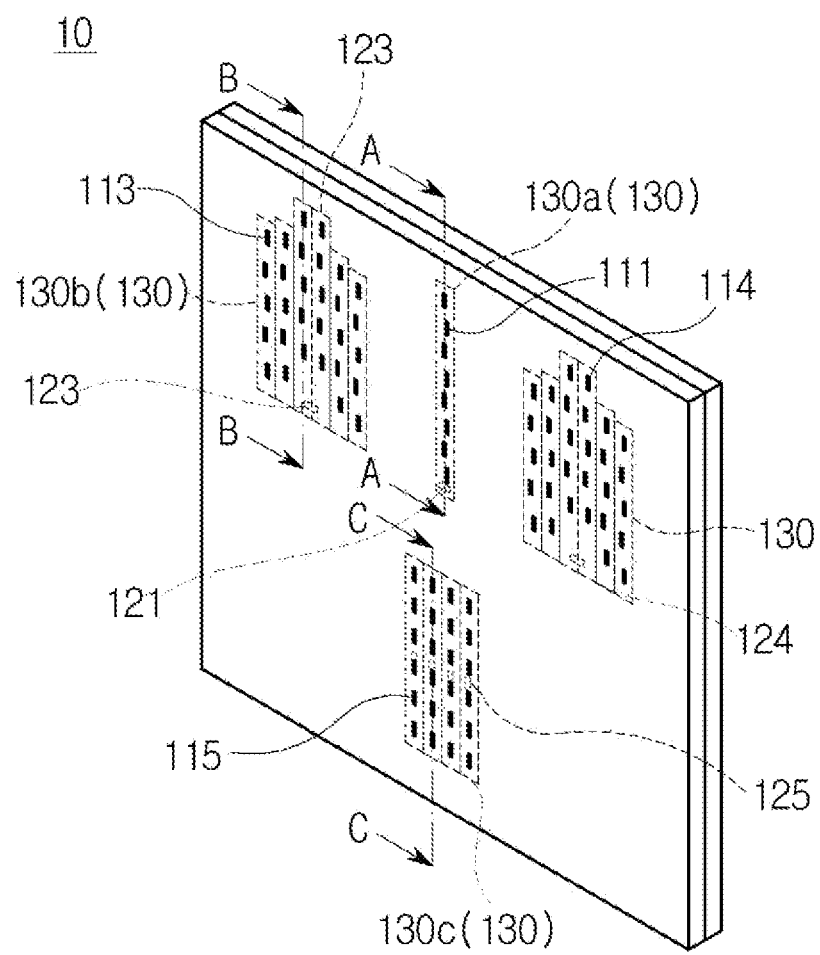

[FIG. 4]
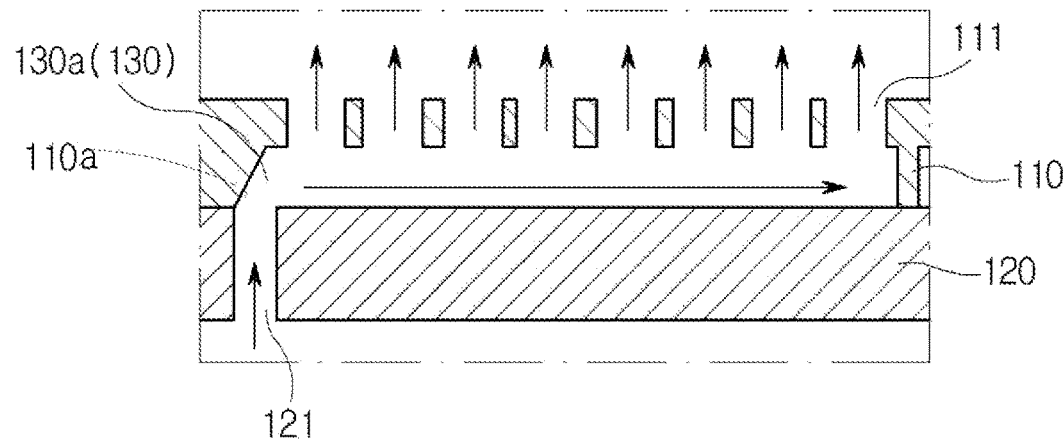
[FIG. 5]
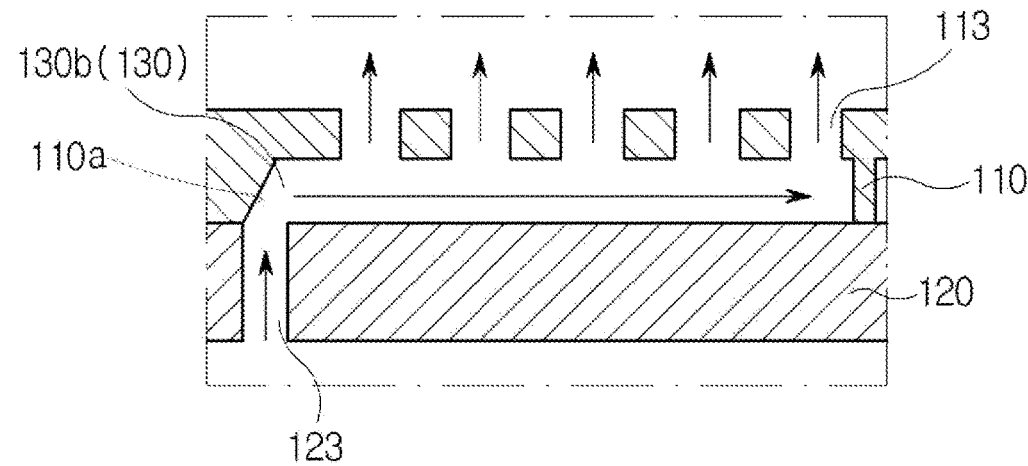

[FIG. 6]
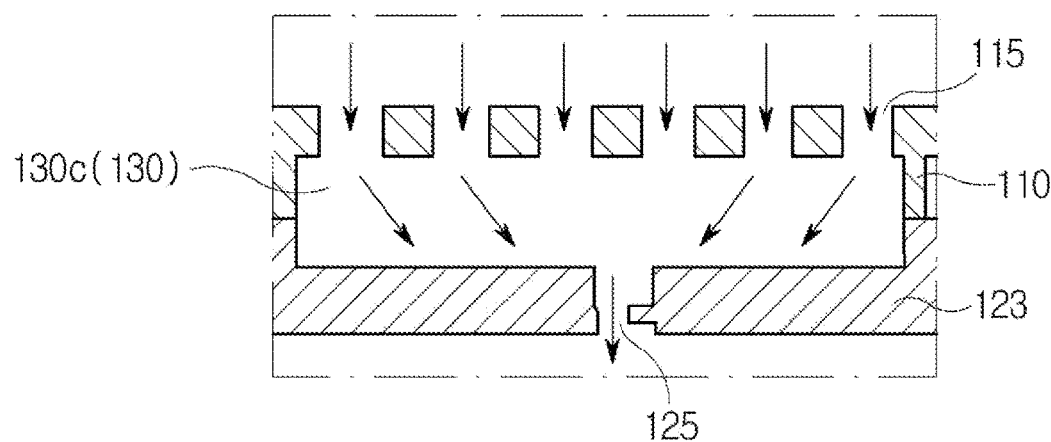
[FIG. 7]
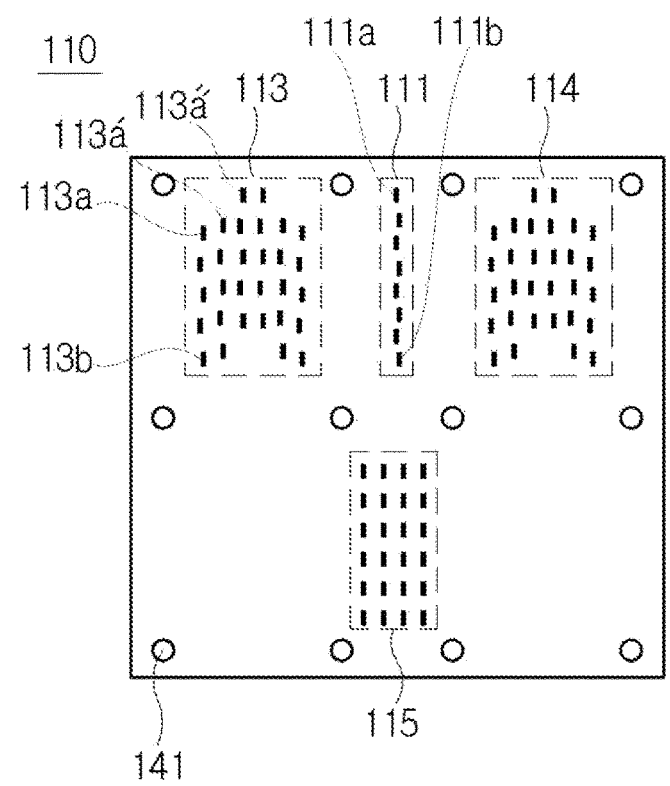

[FIG. 8]
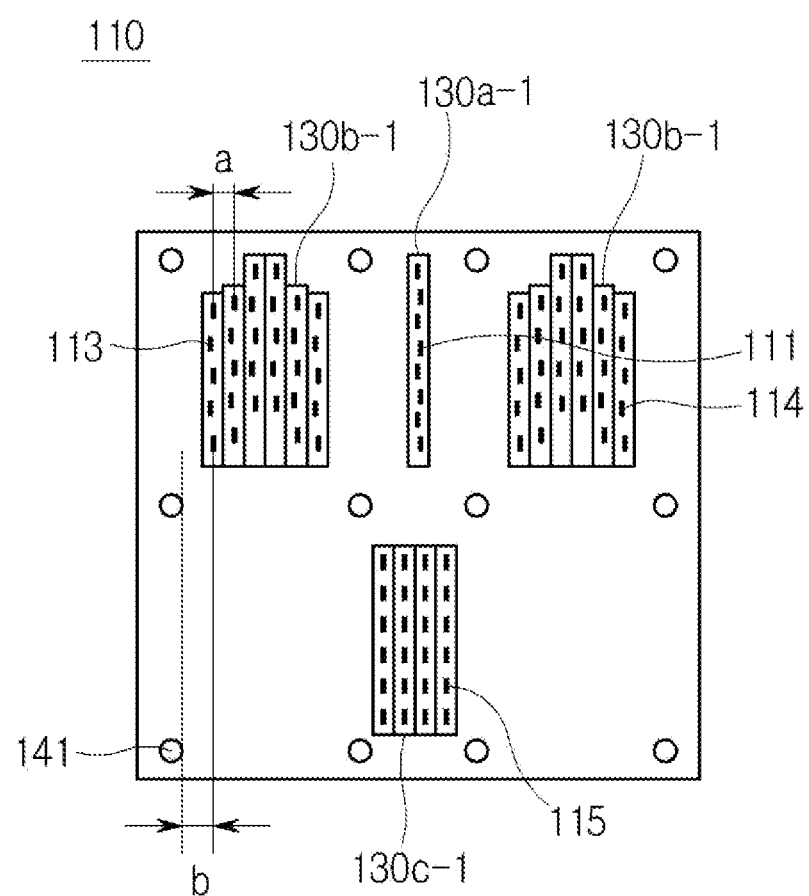

[FIG. 9]
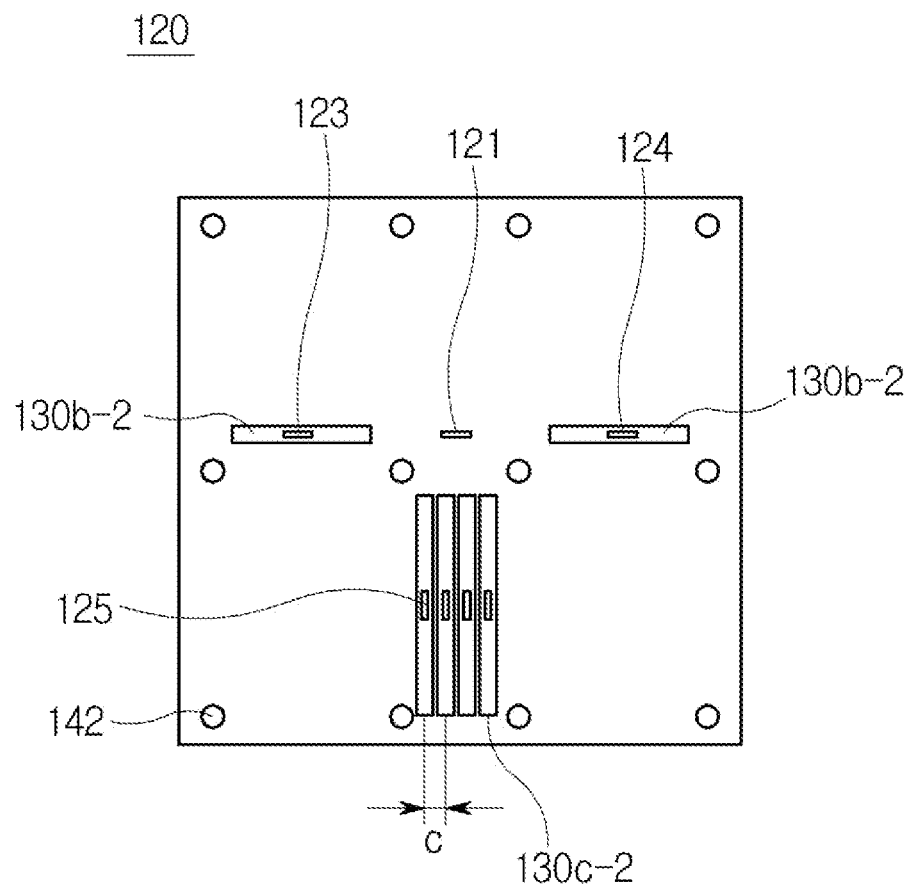

[FIG. 10]
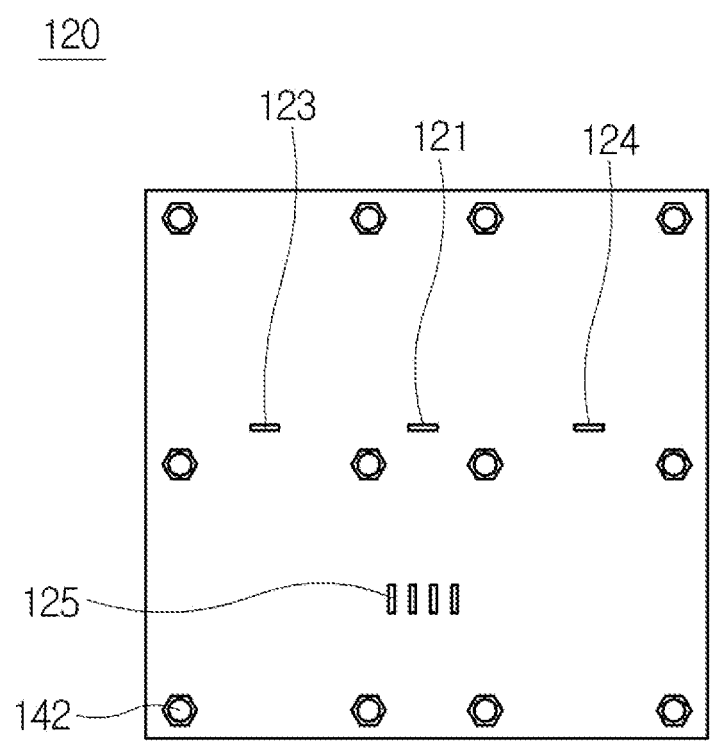

[FIG. 11A]
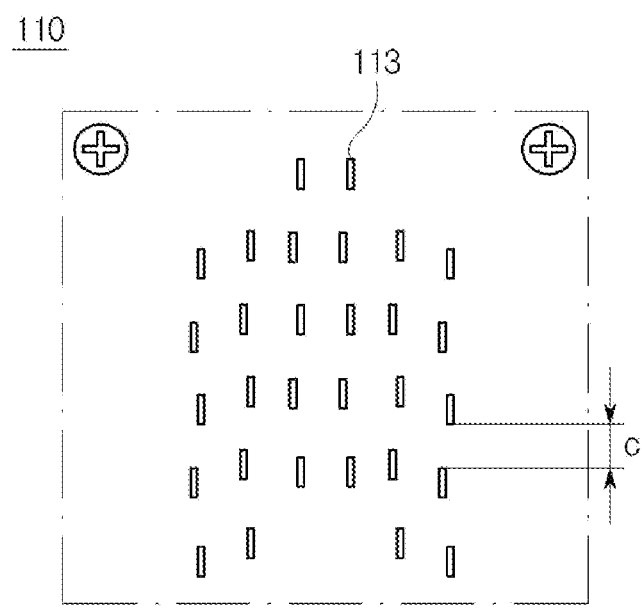
(a)
[FIG. 11B]
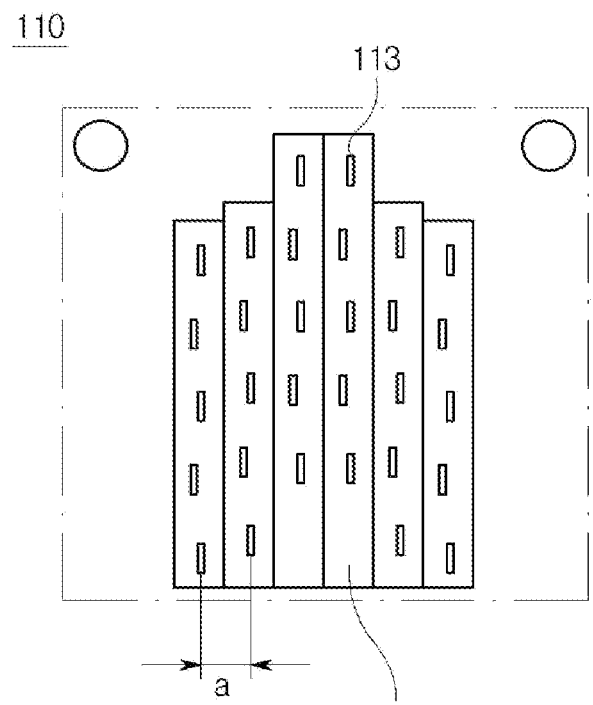
(b)

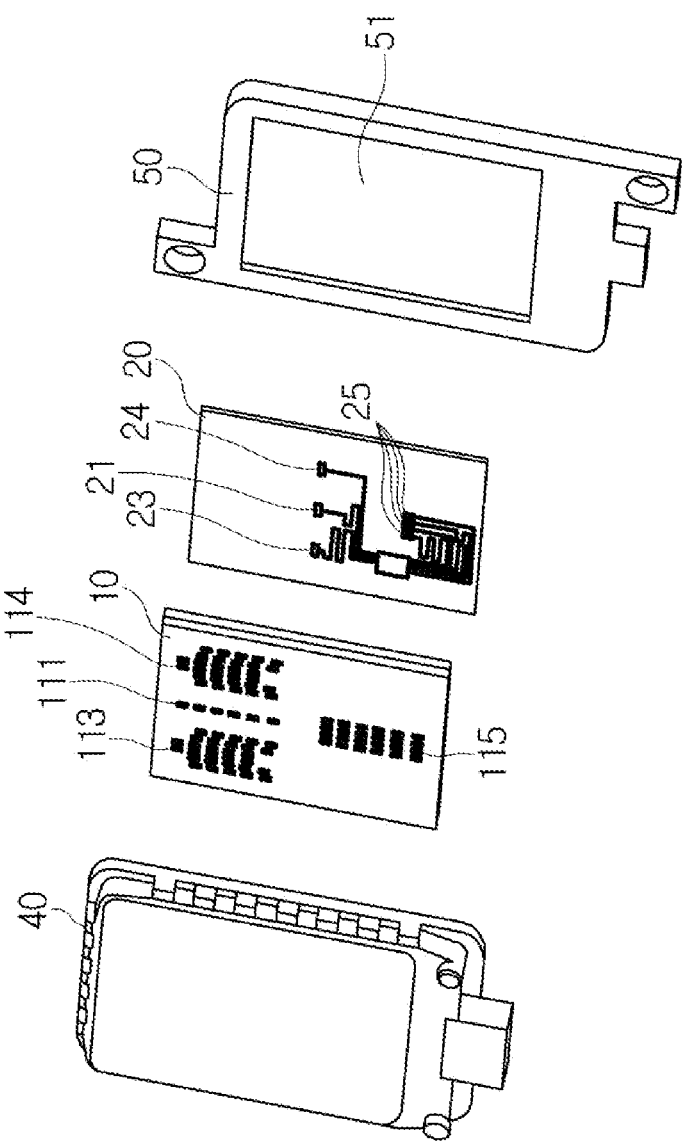

RADAR ANTENNA

TECHNICAL FIELD

The present disclosure relates to an antenna, and more particularly, to a radar antenna.

BACKGROUND ART

According to the recent trend, a radar antenna is used to transmit/receive a signal for detecting an object around a vehicle. The radar antenna enables a driver to determine whether an object is present, the distance to the object, the moving direction of the object, and the moving speed of the object, and to identify and classify the object, on the basis of a scattered wave or reflected wave which is transferred after a radio wave radiated by the radar antenna has collided with the object.

Recently, research is being conducted on technologies for widening the detection range of the radar antenna and raising the performance of the radar antenna, in order to advance an anti-collision radar of an autonomous vehicle for the age of driverless vehicles.

However, the conventional radar antenna is made of metal and thus has a large weight. Furthermore, the conventional radar antenna includes a waveguide formed by stacking a plurality of plates, which makes it difficult to perform an assembly process. Moreover, eccentricity which occurs during the assembly process may degrade the reliability and performance of the radar antenna.

SUMMARY OF INVENTION

Technical Problem

The present disclosure is proposed to solve the above conventional problem, and an object of the present disclosure is to provide a radar antenna which can raise performance and minimize a loss, and secure productivity because the radar antenna can be reduced in size, easily assembled and manufactured at low cost.

Solution to Problem

To achieve the object, a radar antenna according to an exemplary embodiment of the present disclosure includes an antenna body; a slot radiation part and a slot reception part formed on one side of the antenna body; a transmission port and a reception port formed on the other side of the antenna body; and a plurality of waveguides formed in the antenna body, and configured to connect the slot radiation part to the transmission port, and connect the slot reception part to the reception port, wherein the slot radiation part includes a first slot radiation part configured to radiate a radio wave in a first detection range, and a second slot radiation part and a third slot radiation part configured to radiate radio waves in a second detection range having a larger width and distance than the first detection range.

The second and third slot radiation parts may be respectively arranged on both sides of the first slot radiation part, the first to third slot radiation parts may each include a plurality of slots, and the number of slots included in each of the second and third slot radiation parts may be larger than the number of slots included in the first slot radiation part.

The first slot radiation part may include a plurality of slots arranged in one row in a top-to-bottom direction, and the plurality of slots include in one row are arranged so that portions thereof do not sit on a straight line which connects the uppermost slot to the lowermost slot. The first slot radiation part may include a plurality of slots which are successively arranged at predetermined intervals in a zigzag manner in a top-to-bottom direction.

The second and third slot radiation parts may each include a plurality of slots arranged in a plurality of rows in top-to-bottom and side-to-side directions, and the plurality of slots included in at least one row may be arranged so that portions thereof do not sit on a straight line which connects the uppermost slot to the lowermost slot. The plurality of slots included in at least one row in each of the second and third slot radiation parts may be arranged in a zigzag manner.

The second and third slot radiation parts may each include a plurality of slots arranged in a plurality of rows in top-to-bottom and side-to-side directions, and the uppermost slot in the outermost row among the plurality of rows and the uppermost slot in a row inside the outermost row may be arranged to deviate from each other in a side-to-side direction. The uppermost slot in the outermost row may be disposed at a lower level than the uppermost slot in the row inside the outermost row, and the uppermost slots in the respective rows may be disposed at levels that gradually increase from the outermost row toward the row inside the outermost row. The number of slots included in the outermost row may be equal to the number of slots included in the row inside the outermost row.

The slot reception part may be located at the center bottom of the front side of the antenna body, the slot reception part may include a plurality of slots arranged in a plurality of rows in top-to-bottom and side-to-side directions, and the slots included in each of the rows may be arranged on a straight line.

The number of the reception ports may be larger than the number of the transmission ports.

The antenna may include a first plate and a second plate, and the plurality of waveguides may be formed by assembling the first and second plates. The waveguide may be a straight channel formed by coupling the first to third slot radiation parts, a plurality of slot grooves which are formed on the rear side of the first plate so as to communicate with the slot reception part, and a plurality of concave grooves which are formed on the front side of the second plate so as to communicate with the transmission port and the reception port, respectively.

In the second slot radiation part, the transmission port formed as one slot on one side of the concave groove may be connected to the second slot radiation part formed as a plurality of slots in a longitudinal direction of the slot groove along the waveguide formed by the concave groove and the slot groove.

The bottoms of the slot grooves corresponding to the second slot radiation part may be arranged on the same line in a horizontal direction so as to correspond to a horizontal concave groove including the transmission port. In the slot reception part, the reception port formed as one slot in the middle of the concave groove may be connected to the slot reception part formed as a plurality of slots in the longitudinal direction of the slot groove through the waveguide formed by coupling the concave groove and the slot groove. The slot groove may have an inclined wall formed at a position facing a slot formed in the concave groove and configured to guide a radio wave.

Advantageous Effects

According to the present disclosure, the slot radiation parts may be configured as two kinds of slot radiation parts to effectively detect an object at a long distance and an object at a short distance, and the air waveguide may be applied to raise the performance while minimizing a loss.

Furthermore, the slot radiation part may include a plurality of slots arranged in a plurality of rows, and the plurality of slots included in each of the rows may be arranged in a zigzag manner, which makes it possible to raise the gain of the antenna and acquire high directionality, while reducing the size of the antenna.

Furthermore, since the radar antenna having a waveguide structure for connecting slots is manufactured by coupling two plates each configured by coating a molding product with metal, the radar antenna may be easily assembled, and manufactured at low cost, which makes it possible to secure productivity.

Therefore, the radar antenna may be applied to a vehicle, thereby contributing to not only effectively detecting an object at a long distance and an object at a short distance, but also advancing an anti-collision radar of an autonomous vehicle.

BRIEF DESCRIPTION OF DRAWINGS

FIG. 1 is a perspective view illustrating a front side of a radar antenna in accordance with an embodiment of the present disclosure.

FIG. 2 is a perspective view illustrating a rear side of the radar antenna in accordance with the embodiment of the present disclosure.

FIG. 3 is a perspective view illustrating the front side of the radar antenna in accordance with the embodiment of the present disclosure.

FIG. 4 is a cross-sectional view taken along line A-A of FIG. 3.

FIG. 5 is a cross-sectional view taken along line B-B of FIG. 3.

FIG. 6 is a cross-sectional view taken along line C-C of FIG. 3.

FIG. 7 is a diagram illustrating a front side of a first plate in accordance with the embodiment of the present disclosure.

FIG. 8 is a diagram illustrating a rear side of the first plate in accordance with the embodiment of the present disclosure.

FIG. 9 is diagram illustrating a front side of a second plate in accordance with the embodiment of the present disclosure.

FIG. 10 is diagram illustrating a rear side of the second plate in accordance with the embodiment of the present disclosure.

FIGS. 11A and 11B are diagrams illustrating a slot radiation part on the front side of the first plate and a slot groove on the rear side of the first plate in accordance with the embodiment of the present disclosure.

FIG. 12 is a diagram illustrating a radome-integrated radar package to which the embodiment of the present disclosure is applied.

DESCRIPTION OF EMBODIMENTS

Hereafter, an embodiment of the present disclosure will be described in detail with reference to the accompanying drawings.

Referring to FIGS. 1 to 3, a radar antenna 10 in accordance with an embodiment of the present disclosure includes an antenna body 100, slot radiation parts 111, 113 and 114, a slot reception part 115, transmission ports 121, 123 and 124, reception ports 125 and a waveguide 130.

In order to promote understandings in the embodiment of the present disclosure, the side on which the slot radiation parts 111, 113 and 114 and the slot reception part 115 are formed is referred to as a front side, and the side on which the transmission ports 121, 123 and 124 and the reception ports 125 are formed is referred to as a rear side.

The antenna body 100 forms the exterior of the radar antenna 10, and is formed in a plate shape with a predetermined thickness. The slot radiation parts 111, 113 and 114 and the slot reception part 115 are formed on the front side of the antenna body 100, and the transmission ports 121, 123 and 124 and the reception port 125 are formed on the rear side of the antenna body 100.

The slot radiation parts 111, 113 and 114 radiate radio waves, and the slot reception part 115 receives radio waves reflected from an object after the radio waves radiated from the slot radiation parts 111, 113 and 114 have collided with the object. The slot radiation parts 111, 113 and 114 are each composed of slots for transmitting radio waves, and the slot reception part 115 is composed of slots for receiving radio waves.

As illustrated in FIG. 1, the slot radiation parts 111, 113 and 114 are configured as two kinds of slot radiation parts, i.e. a first slot radiation part 111 and second and third slot radiation parts 113 and 114, and the slot reception part 115 is configured as one kind of slot reception part.

The first slot radiation part 111 radiates radio waves in a first detection range, and the second and third slot radiation parts 113 and 114 radiate radio waves in a second detection range having a larger width and distance than the first detection range. The first detection range is a short distance equal to or less than a preset distance, and the second detection range is a long distance equal to or more than the preset distance. For example, the first detection range may be equal to or less than 100 m, and the second detection range may be equal to or more than 100 m.

The first slot radiation part 111 radiates Tx SSR (short range radar) radio waves at a small beam angle, and the second and third slot radiation parts 113 and 114 radiate Tx LLR (long range radar) radio waves at a relatively large beam angle.

The first slot radiation part 111 is located at the center top of the front side of the antenna body 100 in order to radiate radio waves at a small beam angle, and the second and third slot radiation parts 113 and 114 are respectively located on both sides of the first slot radiation part 111 in order to radiate radio waves at a relatively large beam angle.

The radio waves transferred from the transmission ports 121, 123 and 124 illustrated in FIG. 2 to the first slot radiation part 111 illustrated in FIG. 1 are the same as those transferred from the transmission ports 121, 123 and 124 illustrated in FIG. 2 to the second and third slot radiation parts 113 and 114 illustrated in FIG. 1. However, since a signal is split due to the left and right directionality of the second and third slot radiation parts 113 and 114, the radio waves radiated through the second and third slot radiation parts 113 and 114 have a larger beam angle than those radiated through the first slot radiation part 111.

The second and third slot radiation part 113 and 114 and the first slot radiation part 111 are each composed of a plurality of slots. The second and third slot radiation parts 113 and 114 each have a larger number of slots than the first slot radiation part 111. This is in order to raise the performance of the antenna by widening the detection range to a wider bandwidth.

The slot reception part 115 is located at the center bottom of the front side of the antenna body 100.

The slot reception part 115 has a plurality of slots arranged in a plurality of rows. Desirably, the plurality of slots included in the slot reception part 115 are formed as a plurality of rows arranged in vertical and horizontal directions.

Referring to FIG. 2, the transmission ports 121, 123 and 124 and the reception ports 125 are formed on the rear side of the antenna body 100. The radar antenna 10 includes a substrate 20 disposed on the rear side thereof, the substrate 20 serving to transmit a radio wave to the outside through the radar antenna 10 and process a radio wave received through the radar antenna 10.

The transmission ports 121, 123 and 124 are connected to transmission terminals 21, 23 and 24 of the substrate 20, and the reception ports 125 are connected to a reception terminal 25 of the substrate 20. The substrate 20 is a substrate on which the transmission terminals 21, 23 and 24 and the reception terminal 25 are separately located (see FIG. 12).

The number of the reception ports 125 is larger than the number of the transmission ports 121, 123 and 124. In an embodiment, four reception ports 124 and three transmission ports are provided. In order to optimize the reception performance, the number of the reception ports 125 may be set to a larger value than the number of the transmission ports 121, 123 and 124.

The transmission ports 121, 123 and 124 may be arranged at wide intervals to radiate radio waves in a wider range, and the reception ports 125 may be arranged at relatively narrow intervals to optimize the radio wave reception performance.

In an embodiment, the transmission ports 121, 123 and 124 include the center transmission port 121 connected to the first slot radiation part 111 and the left transmission port 123 and the right transmission port 124, which are respectively arranged on both sides of the center transmission port 121 and connected to the second slot radiation part 113 and the third slot radiation part 114 which are located on the left and right in FIG. 2, respectively. The number of the reception ports 125 corresponds to the number of rows in the arrangement of the slots forming the slot reception part 115.

In an embodiment, four reception ports 125 are formed to correspond to the four rows of slots included in the slot reception part 115, respectively.

Referring to FIG. 3, the antenna body 100 includes a waveguide 130 formed by assembling a first plate 110 in which the first to third slot radiation parts 111, 113 and 114 and the slot reception part 115 are formed and a second plate 120 in which the transmission ports 121, 123 and 124 and the reception ports 125 are formed.

The first plate 110 and the second plate 120 are manufactured as a molding product, and coated with metal. When the waveguide 130 is formed by assembling the first and second plates 110 and 120 manufactured as molding products, the antenna assembling work is performed more easily than a method for manufacturing an antenna through a multilayer stacking method. Furthermore, since the first and second plates 110 and 120 are manufactured as molding products, the dimension accuracy of the antenna is secured to prevent an occurrence of deviation, and the product reliability is secured.

Furthermore, when the first and second plates 110 and 120 are manufactured as molding products, coated with metal, and then assembled to form the antenna, the productivity of the antenna may be improved much more than the multilayer stacking method. The reason to coat the first and second plates 110 and 120 with high-conductivity metal is in order to efficiently transmit and receive radio waves. The radio waves come into contact with the metal while passing through the waveguide 130, thereby having directionality.

The first and second plates 110 and 120 may be made of various materials. Desirably, however, the first and second plates 110 and 120 may be made of PEI (Polyetherimide) which is one of high-performance engineering plastics. The metal with which the molding product is coated may be one or more metals selected from copper, silver and nickel. Since the PEI has excellent bonding strength with the coating metal, the metal does not peel off after the molding products are coated with the metal.

The first and second plates 110 and 120 may be assembled through fixing parts 150. The fixing parts 150 may each include a bolt and nut which are fastened through fixing holes 141 and 142 formed in the first and second plates 110 and 120 (see FIGS. 1 and 2).

The waveguide 130 is a hollow tube whose inner circumferential surface is coated with metal, and serves as a transmission line for transmitting a radio wave. The waveguide 130 includes a first waveguide 130a, a second waveguide 130b and a third waveguide 130c.

The waveguide 130 includes a plurality of straight channels which connect the transmission ports 121, 123 and 124 to the slot radiation parts 111, 113 and 114, and connect the reception ports 125 and the slot reception part 115. Specifically, the waveguide 130 serves as a straight channel for connecting one slot, corresponding to each of the transmission ports 121, 123 and 124 and the reception ports 125, to a plurality of slots corresponding to each of the slot radiation parts 111, 113 and 114 and the slot reception part 115.

That is, radio waves transmitted from the transmission terminals 21, 23 and 24 illustrated in FIG. 12 to the transmission ports 121, 123 and 124 are transferred to the slot radiation parts 111, 113 and 114 through the waveguide 130, and radio waves received through the slot reception part 115 are transferred to the reception ports 125 through the waveguide 130.

Referring to FIG. 4, the first waveguide 130a is formed on the rear side of the first slot radiation part 111 formed in the first plate 110 so as to correspond to the row of the slots, and the transmission port 121 formed as one slot in the second plate 120 is connected to the first waveguide 130a corresponding to the row. At a bottom position of the first waveguide 130a, facing the transmission port 121, an inclined wall 110a is formed to guide a radio wave.

In such a radar antenna, a Tx radio wave is transferred through the transmission port 121, formed as one slot on one side of the bottom of the first waveguide 130a, and introduced into the first waveguide 130a via the inclined wall 110a. Then, the Tx radio wave transferred along the first waveguide 130a is radiated to the outside through the first slot radiation part 111 which is formed through the front side of the first waveguide 130a and composed of the plurality of slots arranged in one row.

Furthermore, as illustrated in FIG. 5, a Tx radio wave is introduced into the second waveguide 130b through the transmission port 123 which is provided as one slot on one side of the bottom of the second waveguide 130b formed on the rear side of the first plate 110. Then, the introduced Tx radio wave is transferred along the second waveguide 130b, and radiated to the outside through the second slot radiation part 113 composed of a plurality of slots arranged on the front side of the second waveguide 130b. Although not illustrated, the third slot radiation part 114 may have a symmetrical structure with the second slot radiation part 113.

Referring to FIG. 6, an Rx radio wave in the radar antenna is introduced into the third waveguide 130c through the slot reception part 115 composed of a plurality of slots arranged on the front side of the third waveguide 130c, introduced into the reception port 125 formed as one slot at the middle bottom of the third waveguide 130c, and received through the reception port 125.

The slots becoming the transmission ports 121 and 123 through which Tx radio waves are introduced into the first and second waveguides 130a and 130b are disposed on one sides of the bottoms of the first and second waveguides 130a and 130b, and the slot becoming the reception port 125 through which the Rx radio wave introduced into the third waveguide 130c is received is disposed at the middle bottom of the third waveguide 130c.

In order to raise the radiation efficiency, the radar antenna is designed to radiate the Tx radio waves, introduced into one sides of the bottoms of the first and second waveguides 130a and 130b, through the first, second and third radiation parts 111, 113 and 114 including the plurality of slots formed on the front sides of the first and second waveguides 130a and 130b, while transferred along the first and second waveguides 130a and 130b. In this case, when the radio wave is radiated, the phase of the radio wave is merged with the phases of neighboring radio waves, which raises the gain of the antenna. On the contrary, in order to efficiently optimize the reception performance, the radar antenna is designed to transfer the Rx radio wave, introduced through the third waveguide 130c, to the slot formed at the middle bottom of the third waveguide 130c.

If a radio wave is not received but transmitted through the structure of FIG. 6, the radio wave does not move along the waveguide, but moves straight so as to be radiated. Thus, the gain of the antenna is lowered.

Hereafter, the first and second plates constituting the antenna body will be described in detail.

Referring to FIGS. 7 and 8, the first plate 110 is formed in a plate shape. The first plate 110 includes the first slot radiation part 111, the second slot radiation part 113, the third slot radiation part 114 and the slot reception part 115.

The first slot radiation part 111 includes a plurality of slots arranged in one row on the same plane in a top-to-bottom direction on the drawings. Desirably, the plurality of slots included in the first slot radiation part 111 are arranged in one row on the same plane in the top-to-bottom direction. Furthermore, the plurality of slots are arranged so that portions thereof do not sit on a straight line connecting the uppermost slot 111a and the lowermost slot 111b.

More desirably, the plurality of slots included in the first slot radiation part 111 are successively formed at predetermined intervals in the top-to-bottom direction, while arranged in a zigzag manner.

The reason why the slots included in the first slot radiation part 111 are arranged in one row is in order to form a small beam angle. The small beam angle is used to detect an object at a short distance. Furthermore, the reason why the slots include in the first slot radiation part 111 are arranged in a zigzag manner is in order to constantly maintain the interval between the slots and to reduce the length of the antenna more than when slots are arranged in a straight line.

The second slot radiation part 113 and the third slot radiation part 114 are respectively disposed on both sides of the first slot radiation part 111, with a predetermined distance provided therebetween. The second slot radiation part 113 and the third slot radiation part 114 may be symmetrically disposed with the first slot radiation part 111 interposed therebetween. As the beam patterns of radio waves radiated from the second and third slot radiation parts 113 and 114 are merged with the beam pattern of a radio wave radiated from the first slot radiation part 111, the directionality of the radio waves may be reduced.

The second and third slot radiation parts 113 and 114 each include a plurality of slots arranged in a plurality of rows in top-to-bottom and side-to-side directions. Desirably, the plurality of slots included in each of the second and third slot radiation parts 113 and 114 are formed on the same plane and arranged in a plurality of rows in the side-to-side and top-to-bottom directions.

For example, the plurality of slots included in at least one row of the second slot radiation part 113 are arranged so that portions thereof do not sit on a straight line connecting the uppermost slot 113a and the lowermost slot 113b in the corresponding row.

More desirably, the plurality of slots constituting at least one row in the second slot radiation part 113 are successively formed at predetermined intervals in the top-to-bottom direction, while arranged in a zigzag manner.

The reason why the plurality of slots constituting the second slot radiation part 113 are arranged in a plurality of rows is in order to optimize the number of slots for the gain of the antenna. Furthermore, the reason why the plurality of slots constituting the second slot radiation part 113 are arranged in a plurality of rows and the plurality of slots included in each of the rows are arranged in a zigzag manner is in order to acquire a high gain and high directionality. The third slot radiation part 114 has the same structure as the second slot radiation part 113.

When the slots constituting the first slot radiation part 111 and the second and third slot radiation parts 113 and 114 are arranged at predetermined intervals on the same plane in the top-to-bottom and side-to-side directions, the gain of the antenna may be increased to acquire a very sensitive directional characteristic. Furthermore, when the slots constituting the first slot radiation part 111 and the second and third slot radiation parts 113 and 114 are arranged in a zigzag manner, the length of the antenna may be shortened while the gain thereof is raised.

For example, the slots of the second slot radiation part 113 are arranged so that the position of the uppermost slot 113a in the outermost row among the plurality of rows deviates from the positions of the uppermost slots 113a' and 113a" in rows inside the outermost row in the side-to-side direction. Desirably, in the second slot radiation part 113, the heights of the uppermost slots 113a, 113a' and 113a" in the respective rows in the top-to-bottom direction have a relationship of (113a<113a'<113a") from the outermost row toward the rows inside the outermost row.

More desirably, the slots of the second slot radiation part 113 are arranged in a reverse V shape while the heights of the uppermost slots 113a, 113a' and 113a" have a relationship of (113a<113a'<113a") from the middle row toward the outermost row. Specifically, in the arrangement of the slots included in the second slot radiation part 113, the uppermost slot 113a" in the middle row has the largest height, and the uppermost slot 113a in the outermost row has the smallest height. This is in order to raise the gain by adjusting the positions of the slots in the respective rows in consideration of phases.

Since the positions of the slots in the respective rows of the second slot radiation part 113 are adjusted so that the slots deviate from one another, the phases of radio waves radiated through the slots are merged with the phases of neighboring radio waves, which increases the gain of the antenna. When the gain of the antenna is high, it indicates that the antenna can send a stronger radio wave in a specific desired direction.

In the second slot radiation part 113, the slots included in the outermost row are arranged so as to deviate from the slots included in the rows inside the outermost row, but the number of the slots included in the outermost row is equal to the number of the slots included in each of the rows inside the outermost row.

The third slot radiation part 114 may be disposed symmetrically with the second slot radiation part 113 on the basis of the first slot radiation part 111, and have the same structure as the second slot radiation part 113.

The slot reception part 115 is disposed at the center bottom of the first plate 110.

The plurality of slots included in the slot reception part 115 are arranged in a plurality of rows in the top-to-bottom and side-to-side directions. The slots included in each of the rows of the slot reception part 115 are arranged on a straight line. The number and arrangement shape of the slots included in the slot reception part 115 are set to optimize the radio wave reception performance.

Referring to FIG. 8, a plurality of slot grooves 130*a*-1, 130*b*-1 and 130*c*-1 are formed on the rear side of the first plate 110. The slot grooves 130*a*-1, 130*b*-1 and 130*c*-1 are coupled to concave grooves 130*b*-2 and 130*c*-2 formed on the front side of the second plate 120, thereby forming the waveguide 130. The slot groves 130*a*-1, 130*b*-1 and 130*c*-1 communicate with the slots in the respective rows, which form the first to third slot radiation parts 111, 113 and 114 and the slot reception part 115. Therefore, when the first plate 110 is seen from the rear side, the plurality of slots are formed in each of the slot grooves 130*a*-1, 130*b*-1 and 130*c*-1 in the longitudinal direction of the first plate 110.

The slot grooves 130*a*-1, 130*b*-1 and 130*c*-1 each have a length enough to include the slots in the corresponding row, and have a concave cross-section. The edges of the slot grooves 130*a*-1, 130*b*-1 and 130*c*-1 are rounded or each have an inclined wall to reduce a polarization loss while the radio waves are easily transferred.

Although the slots included in each of the rows in the second and third slot radiation parts 113 and 114 are arranged in a zigzag manner in the top-to-bottom direction, the distance (a) between the outermost row and the row inside the outermost row is so uniform as to remove side lobes. As the side lobes are removed, the main beam pattern is formed as a strong beam pattern to raise the directionality. When the directionality is high, it indicates that the antenna can transmit a stronger radio wave in a specific direction.

The side lobes indicate that radio waves from the horizontal slots are radiated in directions other than the direction of the main beam. When radio waves are radiated from a slot array antenna, the largest beam pattern which was originally intended is the main beam, and the other small beam patterns are the side lobes. The main beam and the side lobes need to be properly harmonized with each other, in order to make a sharp and strong main beam pattern.

In order to optimize the influence of the side lobes according to a waveguide offset (deviation), the distance (b) between the lowermost slot in the outermost row of the second slot radiation part 113 and the fixing hole 141 and the distance (a) between the respective rows may be set to the optimized constant distances.

The bottoms of the slot grooves 130*b*-1 corresponding to the second and third slot radiation parts 113 and 114 are disposed on the same line in the horizontal direction so as to correspond to the concave grooves 130*b*-2 including the transmission ports 123 and 124. Thus, the radio waves introduced into the transmission ports 123 and 124 may be split and transferred to the slot grooves 130*b*-1 of the respective rows through the concave groove 130*b*-2, and radiated to the outside through the slots of the respective rows.

The slot reception part 115 is located at the center bottom of the first plate 110. The slot reception part 115 includes a plurality of slots arranged in a plurality of straight line patterns. The slots included in the slot reception part 115 are arranged in a plurality of straight line patterns, in order to optimize the radio wave reception performance. The slots included in the slot reception part 115 may be arranged in a zigzag manner, if necessary.

Referring to FIGS. 9 and 10, the second plate 120 is formed in a plate shape corresponding to the first plate 110. The second plate 120 includes the transmission parts 121, 123 and 124 and the reception ports 125, which are formed therein.

The concave grooves 130*b*-2 extended in the side-to-side direction are formed on the front side of the second plate 120, corresponding to the transmission ports 123 and 124 located on both sides of the center transmission port 121. The concave groove 130*b*-2 has a length enough to include the bottoms of the slot grooves 130*b*-1 corresponding to the second slot radiation parts 113 and 114, such that radio waves can be transmitted to the plurality of slot grooves 130*b*-1. The transmission ports 123 and 124 are formed in the centers of the respective concave grooves 130*b*-2 such that radio waves are easily spread. The transmission ports 123 and 124 are located on one side of the slot grooves 130*b*-1, i.e. at the bottoms thereof.

Therefore, the radio waves introduced into the concave grooves 130*b*-2 through the transmission ports 123 and 124 are transferred in the side-to-side direction along the concave grooves 130*b*-2, and introduced into the bottoms of the respective slot grooves 130*b*-1. The radio waves introduced into the bottoms of the respective slot grooves 130*b*-1 are radiated to the outside through the plurality of slots formed in the slot grooves 130*b*-1, while transferred upward along the slot grooves 130*b*-1.

Since the slots of the first slot radiation part 111 are arranged in one row, no concave groove is formed on the front side of the second plate 120, corresponding to the center transmission port 121.

The concave grooves 130*c*-2 are formed on the front side of the second plate 120, corresponding to the reception ports 125. The number of the concave grooves 130*c*-2 corresponds to the number of the reception ports 125, and the concave grooves 130*c*-2 are formed in the top-to-bottom direction.

The concave grooves 130*c*-2 are coupled to the plurality of slot grooves 130*c*-1 formed in the first plate 110, and form the waveguide 130. The reception ports 125 are formed in the middles of the respective concave grooves 130*b*-2, and serve to optimize the reception performance.

As such, the waveguide 130 is formed by coupling the plurality of slot grooves 130*a*-1, 130*b*-1 and 130*c*-1, which are formed on the rear side of the first plate 110 so as to communicate with the slot radiation parts 111, 113 and 114 and the slot reception part 115, to the plurality of concave groove 130*b*-2 and 130*c*-2 which are formed on the front side of the second plate 120 so as to communicate with the transmission ports 121, 123 and 124 and the reception ports 125.

Therefore, the radiation part for transmitting a radio wave has a structure in which one slot formed on one side of the concave groove 130b-2 is connected to the plurality of slots formed in the longitudinal direction in the slot groove 130b-1 along the second waveguide 130b which is a T-shaped straight channel formed by the coupling between the concave groove 130b-2 and the slot groove 130b-1.

The reception part for receiving a radio wave has a structure in which one slot formed in the middle of the concave groove 130c-2 is connected to the plurality of slots formed in the longitudinal direction in the slot groove 130c-1 of the third waveguide 130c which is a straight channel formed by the coupling between the concave groove 130c-2 and the slot groove 130c-1.

When the first and second plates 110 and 120 are assembled, the waveguide 130 formed by the coupling between the slot grooves 130a-1, 130b-1 and 130c-1 of the first plate 110 and the concave grooves 130b-2 and 130c-2 of the second plate 120 may have a hollow and semicircular cross-section. When a high-frequency radio wave having a short wavelength is transmitted through a metal tube, a loss thereof is minimized.

Specifically, when the first and second plates 110 and 120 are assembled, the slot grooves 130b-1 of the first plate 110, corresponding to the second and third slot radiation parts 113 and 114, are covered by the front side of the second plate 120, and the bottoms of the slot grooves 130b-1 are coupled to the concave grooves 130b-2 of the second plate 120 so as to communicate with the concave grooves 130b-2.

Furthermore, when the first and second plates 110 and 120 are assembled, the slot groove 130a-1 corresponding to the first slot radiation part 111 is covered by the front side of the second plate 120, and only the transmission port 121 communicates with the slot groove 130a-1.

Furthermore, when the first and second plates 110 and 120 are assembled, the slot reception part 115 is coupled to the concave groove 130c-2 formed to correspond to the front side of the second plate 120, and covered by the front side of the second plate 120.

Referring to FIGS. 11A and 11B, the interval (c) between the slots of the slot radiation part 113 in the top-to-bottom direction and the interval (b) between the neighboring slots in the side-to-side direction are regular and constant.

The above-described radar antenna is a slot array antenna with a flat waveguide, which is suitable for a vehicle antenna, and various variables such as the sizes, number, shapes and distances of the slots may be adjusted to make various characteristics like an array antenna.

Furthermore, an air waveguide is applied to provide a high gain antenna which has a small loss even at a high frequency.

Furthermore, since the radar antenna is manufactured by plating a plastic molding product with metal, the radar antenna has a shielding effect and heat radiation effect.

Referring to FIG. 12, the radar antenna 10 may be manufactured as a radome-integrated antenna package in which the radar antenna 10 having the substrate 20 disposed on the rear side thereof is seated on a seating groove 51 of a rear radome 50, and a front radome 40 is coupled to the top of the radar antenna 10.

The front and rear radomes 40 and 50 serve to protect the radar antenna 10 from corrosion, such that the radar antenna 10 is stably operated. The front and rear radomes 40 and 50 may be made of a material which hardly scatters radio waves, such that radio wave reliably pass through the radomes, and formed through plastic injection molding.

The transmission ports 121, 123 and 124 of the radar antenna 10 may be connected to the transmission terminals 21, 23 and 24 of the substrate 20 so as to transmit radio waves, and the reception ports 125 may be connected to the reception terminals 25 of the substrate 20 so as to receive reflected radio waves. The substrate 20 is a substrate on which the transmission terminals 21, 23 and 24 and the reception terminals 25 are separately located.

The above-described radar antenna 10 is a slot array antenna with a flat waveguide, which is suitable for a vehicle antenna, and various variables such as the sizes, number, shapes and distances of the slots may be adjusted to make various characteristics like an array antenna.

The aging characteristics of the radar antenna in accordance with the present disclosure were measured.

The first and second plates 110 and 120 were manufactured as molding products through an injection molding process using PEI, and the molding products were coated with copper, silver and nickel, in order to measure the bonding strengths between the molding products and the respective metals.

The aging test was performed under the following conditions: a thermal cycle test was repeated in 100 cycles at a temperature of −50° C. to 150° C., the molding products were stored at a high temperature of 150° C. for 1,000 hours, and a temperature humidity test was performed at a temperature of 85° C. and a humidity of 85% RH for 1,000 hours.

The result of the aging test shows that the metal with which the molding product was coated did not peel off, in all the cases where the molding product was coated with copper, silver and nickel, respectively.

The test result shows that two plates formed by coating the molding products with metal can be coupled to manufacture a radar antenna having a waveguide structure which connects slots.

The injection molding makes it possible to manufacture a radar antenna having a waveguide with an accurate dimension. Furthermore, the injection molding may reduce the weight of the radar antenna, and secure the convenience of the assembly process and the productivity.

Furthermore, the sizes, intervals and shapes of the slots forming the slot radiation part and the slot reception part in the radar antenna may be precisely adjusted. As the slots are arranged in a zigzag manner, the size of the antenna may be reduced. Furthermore, the gain of the antenna may be raised through the plurality of slots arranged in a plurality of rows.

In particular, the radar antenna may include two kinds of slot radiation parts to effectively detect an object at a long distance and an object at a short distance, thereby contributing to advancing an anti-collision radar of an autonomous vehicle.

Although the preferred exemplary embodiments of the present disclosure have been described above, it is understood that the present disclosure may be modified in various forms, and those skilled in the art may practice various modified examples and changed examples without departing from the scope of the claims of the present disclosure.

The invention claimed is:
1. A radar antenna comprising:
an antenna body;
a slot radiation part and a slot reception part formed on one side of the antenna body;
a transmission port and a reception port formed on the other side of the antenna body; and
a plurality of waveguides formed in the antenna body, and configured to connect the slot radiation part to the transmission port, and connect the slot reception part to the reception port, wherein the slot radiation part comprises a first slot radiation part configured to radiate a radio wave in a first detection range, and a second slot radiation part and a third slot radiation part configured to radiate radio waves in a second detection range having a larger width and distance than the first detection range, and wherein the second and third slot radiation parts each comprise a plurality of slots arranged in a plurality of rows in top-to-bottom and side-to-side directions, wherein the uppermost slot in the outermost row among the plurality of rows and the uppermost slot in a row inside the outermost row are arranged to deviate from each other in a side-to-side direction.

2. The radar antenna of claim 1, wherein the second and third slot radiation parts are respectively arranged on both sides of the first slot radiation part.

3. The radar antenna of claim 1, wherein the first to third slot radiation parts each comprise a plurality of slots, wherein the number of slots included in each of the second and third slot radiation parts is larger than the number of slots included in the first slot radiation part.

4. The radar antenna of claim 1, wherein the first slot radiation part comprises a plurality of slots arranged in one row in a top-to-bottom direction, wherein the plurality of slots include in one row are arranged so that portions thereof do not sit on a straight line which connects the uppermost slot to the lowermost slot.

5. The radar antenna of claim 1, wherein the first slot radiation part comprises a plurality of slots which are successively arranged at predetermined intervals in a zigzag manner in a top-to-bottom direction.

6. The radar antenna of claim 1, wherein the second and third slot radiation parts each comprise a plurality of slots arranged in a plurality of rows in top-to-bottom and side-to-side directions, wherein the plurality of slots included in at least one row are arranged so that portions thereof do not sit on a straight line which connects the uppermost slot to the lowermost slot.

7. The radar antenna of claim 6, wherein the plurality of slots included in at least one row in each of the second and third slot radiation parts are arranged in a zigzag manner.

8. The radar antenna of claim 1, wherein the uppermost slot in the outermost row is disposed at a lower level than the uppermost slot in the row inside the outermost row.

9. The radar antenna of claim 1, wherein the uppermost slots in the respective rows are disposed at levels that gradually increase from the outermost row toward the row inside the outermost row.

10. The radar antenna of claim 1, wherein the number of slots included in the outermost row is equal to the number of slots included in the row inside the outermost row.

11. The radar antenna of claim 1, wherein the slot reception part is located at the center bottom of the front side of the antenna body.

12. The radar antenna of claim 1, wherein the slot reception part comprises a plurality of slots arranged in a plurality of rows in top-to-bottom and side-to-side directions, wherein the slots included in each of the rows are arranged on a straight line.

13. The radar antenna of claim 1, wherein the number of the reception ports is larger than the number of the transmission ports.

14. The radar antenna of claim 1, wherein the antenna comprises a first plate and a second plate, wherein the plurality of waveguides are formed by assembling the first and second plates.

15. The radar antenna of claim 14, wherein the waveguide is a straight channel formed by coupling the first to third slot radiation parts, a plurality of slot grooves which are formed on a rear side of the first plate so as to communicate with the slot reception part, and a plurality of concave grooves which are formed on a front side of the second plate so as to communicate with the transmission port and the reception port, respectively.

16. The radar antenna of claim 15, wherein in the second slot radiation part, the transmission port formed as one slot on one side of the concave groove is connected to the second slot radiation part formed as a plurality of slots in a longitudinal direction of the slot groove along the waveguide formed by the concave groove and the slot groove.

17. The radar antenna of claim 15, wherein the bottoms of the slot grooves corresponding to the second slot radiation part are arranged on the same line in a horizontal direction so as to correspond to a horizontal concave groove including the transmission port.

18. The radar antenna of claim 15, wherein in the slot reception part, the reception port formed as one slot in the middle of the concave groove is connected to the slot reception part formed as a plurality of slots in the longitudinal direction of the slot groove through the waveguide formed by coupling the concave groove and the slot groove.

19. The radar antenna of claim 15, wherein the slot groove has an inclined wall formed at a position facing a slot formed in the concave groove and configured to guide a radio wave.

* * * * *